(12) United States Patent
Lyons et al.

(10) Patent No.: US 6,382,504 B1
(45) Date of Patent: May 7, 2002

(54) PRINTING APPARATUS AND METHOD

(75) Inventors: Eric G. Lyons; Brian G. Hutchison; Jan Durajczyk, all of Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/275,745

(22) Filed: Mar. 24, 1999

(30) Foreign Application Priority Data

Apr. 14, 1998 (GB) ................................................ 9807632

(51) Int. Cl.⁷ ................................................ G06K 7/10
(52) U.S. Cl. ........................................ 235/379; 235/456
(58) Field of Search ................................ 235/462, 379, 235/456, 454, 494, 375, 436; 400/149, 150, 74, 120.16, 120.17, 124.06, 171; 358/1.14, 1.15, 1.13, 106, 296, 305, 449; 318/561, 811, 564

(56) References Cited

U.S. PATENT DOCUMENTS

| | | | | |
|---|---|---|---|---|
| 4,507,668 A | * | 3/1985 | Horiya et al. ................ | 346/76 |
| 5,134,427 A | * | 7/1992 | Akiyama et al. ........ | 346/453.1 |
| 5,557,752 A | * | 9/1996 | Remion ...................... | 395/285 |
| 5,630,062 A | | 5/1997 | Okutsu ...................... | 395/200 |
| 5,692,110 A | * | 11/1997 | Miyasaka et al. ........... | 395/111 |
| 5,708,912 A | * | 1/1998 | Lee .............................. | 399/24 |
| 5,784,078 A | * | 7/1998 | Furuya ........................ | 347/14 |
| 5,911,527 A | * | 6/1999 | Aruga et al. ................. | 400/149 |
| 5,915,078 A | * | 6/1999 | Miyasaka et al. ........... | 395/111 |
| 6,040,670 A | * | 3/2000 | Kaneko et al. ............. | 318/561 |
| 6,233,568 B1 | * | 5/2001 | Kara .......................... | 705/410 |
| 6,252,673 B1 | * | 6/2001 | Miyasaka et al. .......... | 358/1.18 |

FOREIGN PATENT DOCUMENTS

| | | |
|---|---|---|
| EP | 0341040 | 11/1989 |
| EP | 000519518 A2 * | 12/1992 |
| EP | 0769737 | 4/1997 |
| EP | 0795814 | 9/1997 |
| JP | 2001225533 A * | 8/2001 |

* cited by examiner

Primary Examiner—Thien M. Le

(57) ABSTRACT

The invention provides for printing apparatus comprising printing means and a host processor (28) for delivering print data and command data via a common interface (30) to the said printing means, and characterized in that the host processor is arranged to deliver said print data with a first characteristic and said command data with a second characteristic, and that the printing means comprises a printing device (34) for receiving the said print data and a control device (40) for receiving the said command data, the apparatus further including detecting means (42) for detecting the said characteristic of the data appearing at the common interface (30), and switch means (48) responsive to the detecting means detecting the said first characteristic for switching data from said common interface (30) to the said printing device (34) so that the full potential of the printing device (34) can be realized.

18 Claims, 3 Drawing Sheets

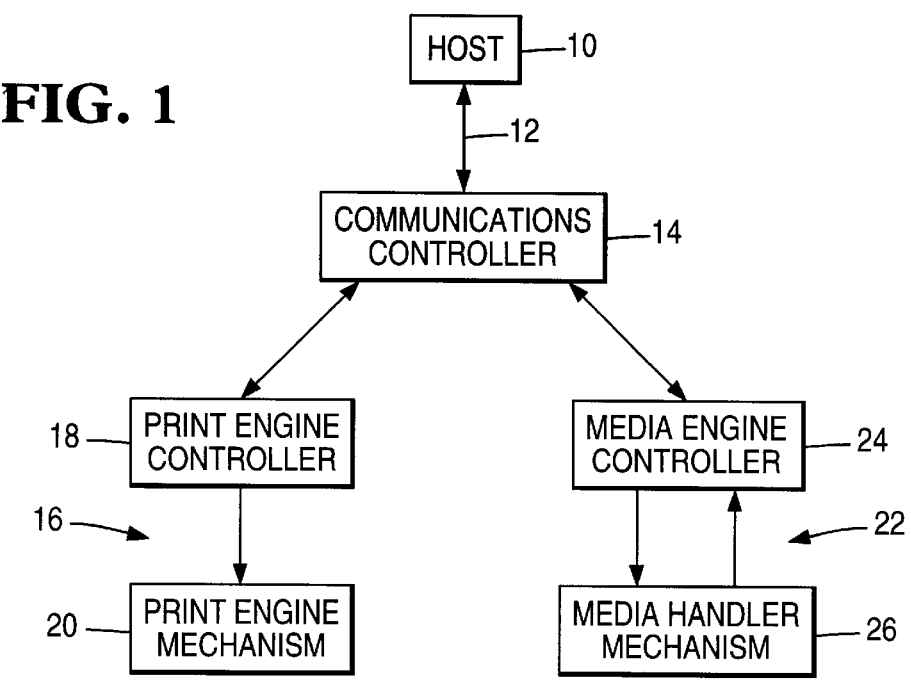
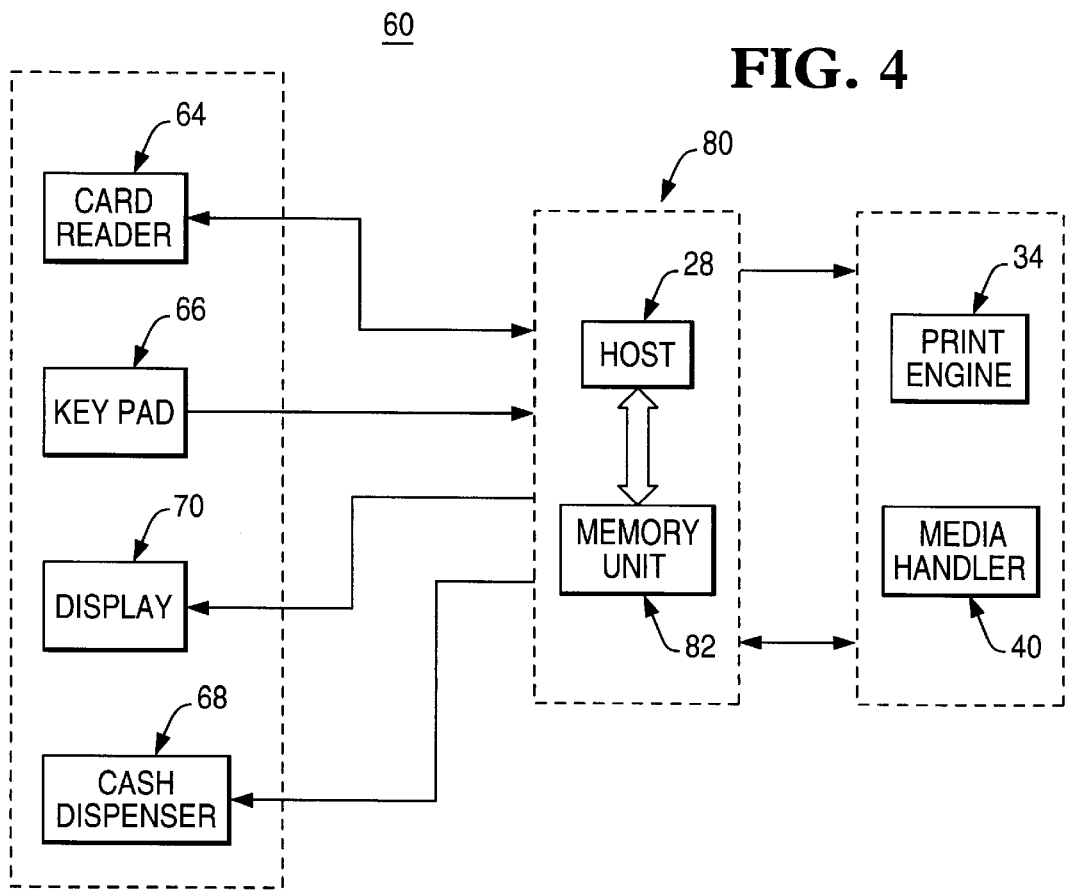

PRINTING APPARATUS AND METHOD

BACKGROUND OF THE INVENTION

The present invention relates to a method and apparatus for the printing of documents and in particular, but not exclusively, to the printing of documents required at a self-service facility such as the Automated Teller Machines (ATMs) provided at banks.

The use of ATMs at financial institutions such as banks is becoming increasingly wide-spread not only in relation to the mere provision of cash funds to a customer but also as regards the provision of other services and information. Thus, as a greater number of services become available at ATMs, so the likelihood of their frequency, and extent, of use is likely to continue to increase.

The increased use of, and demand for, the services available by way of an ATM increases the importance of providing ATMs that are both reliable and efficient in operation. In view of the ever increasing range of services provided by such machines, it is becoming increasingly important for the machine to offer printed matter in the form of statements and reports. Thus, the time that an ATM, when accessed by a customer, will be required to furnish such printed information in the form of, for example, bank statements, will account for a relatively large percentage of the time the ATM is involved in handling a customer's request and, in view of current constraints on the manner in which documents such as bank statements can be printed, this can disadvantageously lead to an overall reduction in the time that the ATM can handle a customer's inquiry thereby leading to an overall decrease in the number of transactions that can be handled by the ATM in any given period.

Thus, to maintain a high standard of efficiency and frequency of service by way of an ATM, it would therefore be advantageous to provide for such a self-service terminal in which functions involving the printing of documents do not adversely limit the overall operation of the ATM.

SUMMARY OF THE INVENTION

The present invention therefore seeks to provide for a printing apparatus and method exhibiting advantages over known such apparatus and methods.

According to one aspect of the present invention there is provided printing apparatus comprising printing means and a host processor for delivering print data and command data via a common interface to the said printing means, and characterized in that the host processor is arranged to deliver said print data with a first characteristic and said command data with a second characteristic, and that the printing means comprises a printing device for receiving the said print data and a control device for receiving the said command data, the apparatus further including detecting means for detecting the said characteristic of the data appearing at the common interface, and switch means responsive to the detecting means detecting the said first characteristic for switching data from said common interface to the said printing device.

The manner in which the print data and command data are delivered over the common interface in accordance with respective data transfer characteristics provides for the basis of an advantageous means for detecting which of the print data and command data is forthcoming from the host. This allows for a particularly efficient means for switching the data for delivery to its appropriate destination in a manner allowing for a direct connection of the host to the print device particularly when print data is being transmitted from the host device so as to advantageously allow for the full-speed of the print device to be realized.

Advantageously, the said detecting means is provided in a communication path for delivering the command data from the interface to the control device so as to advantageously further limit the effect that the detecting means has on the transfer of print data from the host device to the printing device.

Advantageously, at least part of the detecting means is provided by part of the control device which, particularly advantageously, can comprise a relatively low-cost CPU.

Further, the common interface can be associated with a driver which can include an output port from which data identifying the characteristic of the data arriving from the common interface can be made available.

Advantageously, the said switch comprises a data switch having a pass-through mode allowing for the direct connection of the printing device to the host processor.

According to a particular advantage of the present invention, the said characteristics of the respective data delivered from the host processor comprise different modes for data communication arising in accordance with an established protocol.

In particular, the modes are chosen from those arising in the IEEE 1284 standard and, in particular, the print data is arranged to be transferred in accordance with the so-called Compatibility Mode and the command data is arranged to be transmitted in accordance with the Extended Capabilities Port Mode.

Thus, the host PC is arranged to transmit print data in accordance with the compatibility mode of the 1284 standard and its arranged to transmit the command data by means of the extended capabilities port mode of the 1284 standard.

Advantageously, the host processor is arranged to provide for so-called 1284 negotiation as arising in accordance with the IEEE 1284 standard so as to set the common interface of the present invention to the appropriate mode by transmitting the respective forms of data.

Advantageously, the said printing means comprises a print engine controller and a print engine mechanism and, further the said control means comprises a media handler/communication controller and a media handler mechanism.

In accordance with a further feature of the present invention, direct connectivity can be provided between the print engine controller and the media handler controller so as to allow for the direct transfer of status/state information from the print engine controller directly to the media handler controller which can then be past on, in accordance with the extended capabilities port mode of the 1284 standard to the host processor.

Advantageously, the said control device is arranged to receive command data at the same time as it serves to disable the said switch.

Preferably, in accordance with a particular embodiment of the present invention, the printing apparatus comprises part of the print mechanism of a self-service customer access machine and, in particular, an automated teller machine.

According to another aspect of the present invention there is provided a method for printing documents comprising delivering print data and command data from a host processor to printing means comprising a printing device and a control device via a common interface, and characterized by assigning a first characteristic to the said print data and a second characteristic to the said command data and detecting the said characteristic and delivering the data from the host processor to the printing device or the control device responsive to the characteristic detected.

Preferably, the characteristics assigned to the data comprises respective modes of a communications protocol such as the IEEE 1284 standard.

Advantageously, the first characteristic comprises the transfer of data in accordance with the compatibility mode of the 1284 standard and the second characteristic comprises the transfer of data in accordance with extended capabilities port mode of the 1284 standard.

Advantageously, the invention provides for a method as defined above as employing printing apparatus as hereinbefore defined.

BRIEF DESCRIPTION OF THE DRAWINGS

The present invention is described further hereinafter, by way of example only, with reference to the accompanying drawings in which:

FIG. 1 is a schematic block diagram of a self-service printer known in the prior art; and FIGS. 2–4 are schematic block diagram of a self-service printer according to one embodiment of the present invention.

DETAILED DESCRIPTION

Figure 2:
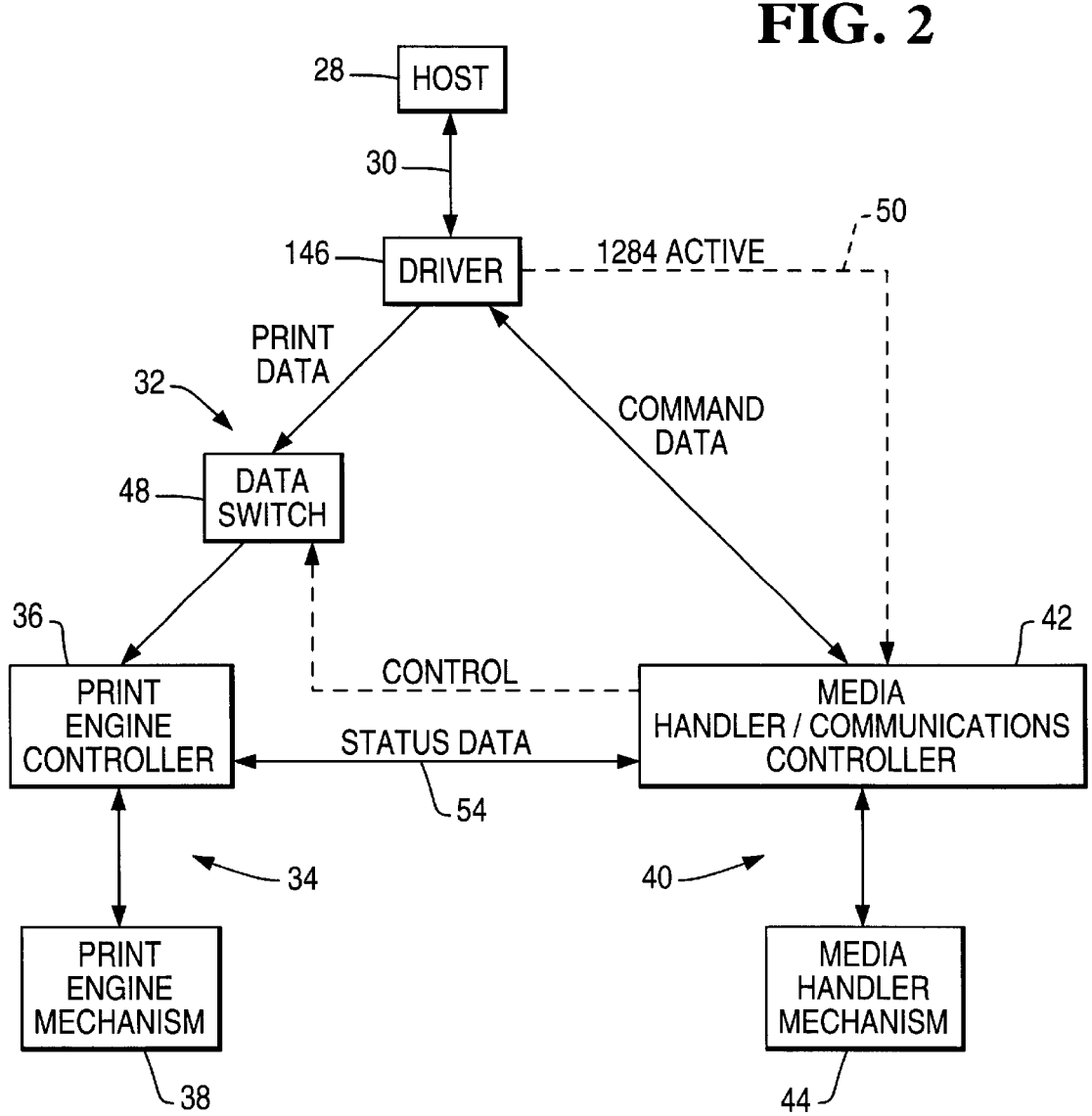

Turning first to FIG. 1, there is illustrated a self-service printer such as that provided in an ATM and as currently known in the prior art.

Such a printer arrangement comprises a host processor 10 which, by means of a single communications interface 12 serves to deliver print data and control data via a common communications controller 14 to either a print device 16 comprising a print engine controller 18 and a print engine mechanism 20, or a control device 22 comprising a print handler controller 24 and a media handler mechanism.

The directions of data transfer in accordance with the sub-systems is indicated by the arrows shown in the drawing.

The use of a single communications interface 12 to the host 10 dictates that the data arriving at the communications controller 14 must be split into its print and control components and then directed to the print device 16 and control device 22 respectively.

In accordance with known self-service printers, the communications controller 14 serves to parse the data stream received from the host processor so as to direct respective elements of the data stream to the appropriate target, i.e. the print device 16 or the control device 22. The print device 16 is generally considered to be communication intensive while the actual communication requirements of the control device 22 such as the media handler controller 24 and the media handler mechanism 26 are much less and considered to be minimal. The performance of the print device is therefore based on this requirement and the performance of the print engine controller 18 and the print engine mechanism 20 commonly exceeds the maximum potential performance of the communications controller which can therefore disadvantageously place a limit on the overall performance of the self-service printer.

Thus, the performance of the communications controller 14 can be seen as the main restriction on the speed of operation that can be achieved by the self-service printer.

Turning now to FIG. 2, there is shown a schematic block diagram of a self-service printer having a somewhat similar overall arrangement to that of the prior art printer shown in FIG. 1, but embodying the present invention. In the illustrated embodiment, the involvement of the communications controller shown in FIG. 1 is advantageously eliminated while having no disadvantageous effect on the functionality of the overall self-service system.

Thus, the present invention overcomes the need to rely on a generally speed-limiting communications controller and the parsing of the data stream passing therethrough.

The illustrated embodiment of the present invention advantageously employs data communications features specified in the standard "IEEE std. 1284–1994 Standard Signaling Method for a Bi-directional Parallel Peripheral Interfaces for Personal Computers", further details of which are discussed below.

Referring now to FIG. 2, there is again shown a self-service printer controlled by means of a host processor 28 and which is intended to deliver print data and command data by way of a common interface 30.

The common interface 30 delivers the data to a switching arrangement 32 which serves to pass the print data on to a print device 34 comprising a print engine controller 36 and a print engine mechanism 38, and to pass on the command data to a control device 40 comprising a media handler/communications controller 42 and a media handler mechanism 44.

Returning to the switching arrangement 32, in the illustrated embodiment, this comprises a driver 46 for receiving the data from the common interface 30 which connects to a data switch 48 which, when enabled, allows for direct connectivity between the host processor 28 and the print device 34. The driver 46 also connects to the media handler/communications controller 42 for delivery of command data thereto.

Also, the driver 46 includes a data port 50 which serves to provide for an indication concerning the particular mode of the 1284 standard currently being employed during the transferred data from the host processor 28.

The status of the data port 50 of the driver 46 is detected within the media handler/communications controller 42, which can advantageously comprise a low-cost PC, and, on the basis of the status of the data port 50 determined by the media handler/communications controller 42, a control signal 52 is delivered to the data switch 48. In the illustrated embodiment, an active signal at the data port 50 of the driver 46 common and as detected by the media handler/communications controller 42, serves to disable the data switch 48 via the control signal 52 so as to allow only for direct conductivity between the host processor 28 and the control device 40.

As noted above, the illustrated embodiment of the present invention employs features specified in the IEEE 1284 standard and, in particular, the host processor is arranged so as to deliver print data in accordance with the Compatibility Mode of that Standard, and to deliver control data in accordance with the Extended Capabilities Port Mode of that standard.

Thus, transfer of the print data from the host processor 28 to the print device 34 occurs in accordance with the aforesaid Compatibility Mode and the existence of this mode is readily detected by the media handler/communications controller 42 which, by means of its control signal 52, serves to switch the data switch 48 to a pass-through mode so as to allow for direct connectivity between the host processor 28 and the print device 34 so that the media handler/communications controller 42 then plays no further part in data transfer.

In this mode, it will be appreciated that the direct connectivity between the host processor 28 and the print device 34 means that the full performance of the print engine controller 36 and the print engine mechanism 38 can be realized by the self-service printer since the only constraint in the overall operating speed is that determined by the performance of the print engine controller 36 and print engine mechanism 38.

However, when command data is to be transmitted from, indeed received by, the host processor 28, the data is arranged to be transmitted in accordance with the Extended Capabilities Port Mode of the IEEE 1284 standard.

The provision of the two aforementioned modes, i.e. Compatability Mode for print data transfer, and the Extended Capabilities Port Mode for a control data transfer, achieved by means of so-called 1284 negotiation at the host processor 28 in accordance with the IEEE 1284 standard.

When the Extended Capabilities Port Mode is employed, the output port 50 of the driver 46 becomes active and this is detected by the media handler/communications controller 42 which then provides a control signal 52 serving to disable the data switch 48 such that subsequent data transfer takes place between the host processor 28 and the media handler/communications controller and the media handler mechanism.

As illustrated by way of the data link 54, status data can be delivered directly from the print engine controller 36 to the media handler/communications controller 42 which can, in turn, be delivered directly from the controller 42 back to the host processor 28 for instigating the appropriate activities such as diagnostic and corrective activities.

It will therefore be appreciated from the above that, with regard to a self-service printer such as that illustrated in the drawings, the problem of a printer which is part of an ATM with a single communications interface not working at the maximum potential speed of the print engine within it can be advantageously overcome by avoiding the manner in which the print and command/status data in the data stream from the host processor are separated in the printer. The full speed of the print engine can therefore be realized over a single parallel communications interface whilst maintaining all self-service functionality previously available. As will be appreciated, a low-cost processor can be used as the media handler/communications controller 42 and the speed of the communications controller 14 arising in the prior art is removed as a potential bottle neck in the communication intensive print-rendering process. Thus, the present invention enables print-rendering subsystem performance enhancements to be directly available to a host system without requiring corresponding performance enhancements of a communications controller 14 as would be required with the prior art.

As mentioned above, the present invention makes use of features arising in the standard "IEEE 1284–1994 Standard Signaling Method for a Bi-Directional Parallel Peripheral Interface for Personal Computers". Also, the present invention employs the forward direction only Compatibility Mode for transfer of the print data from the host processor to the print engine controller, and the bidirectional Extended Capability Port Mode for the transfer of control data between the host processor and the media handler controller. In order to achieve the appropriate mode of operation, the host processor employs the so-called 1284 negotiation as discussed in the IEEE standard/protocol.

As noted in the aforementioned protocol, the concept of "negotiation" has been developed so as to allow a host to determine what the particular capabilities of an attached peripheral might be, and to arrive at a method by which the common interface employed can be set to the appropriate mode. During the negotiation phase, the host commonly places a request on the data lines and then initiates a negotiation sequence. The request can be effectively to put the interface into a particular mode, or request a particular device identification from the peripheral device.

Figure 3:
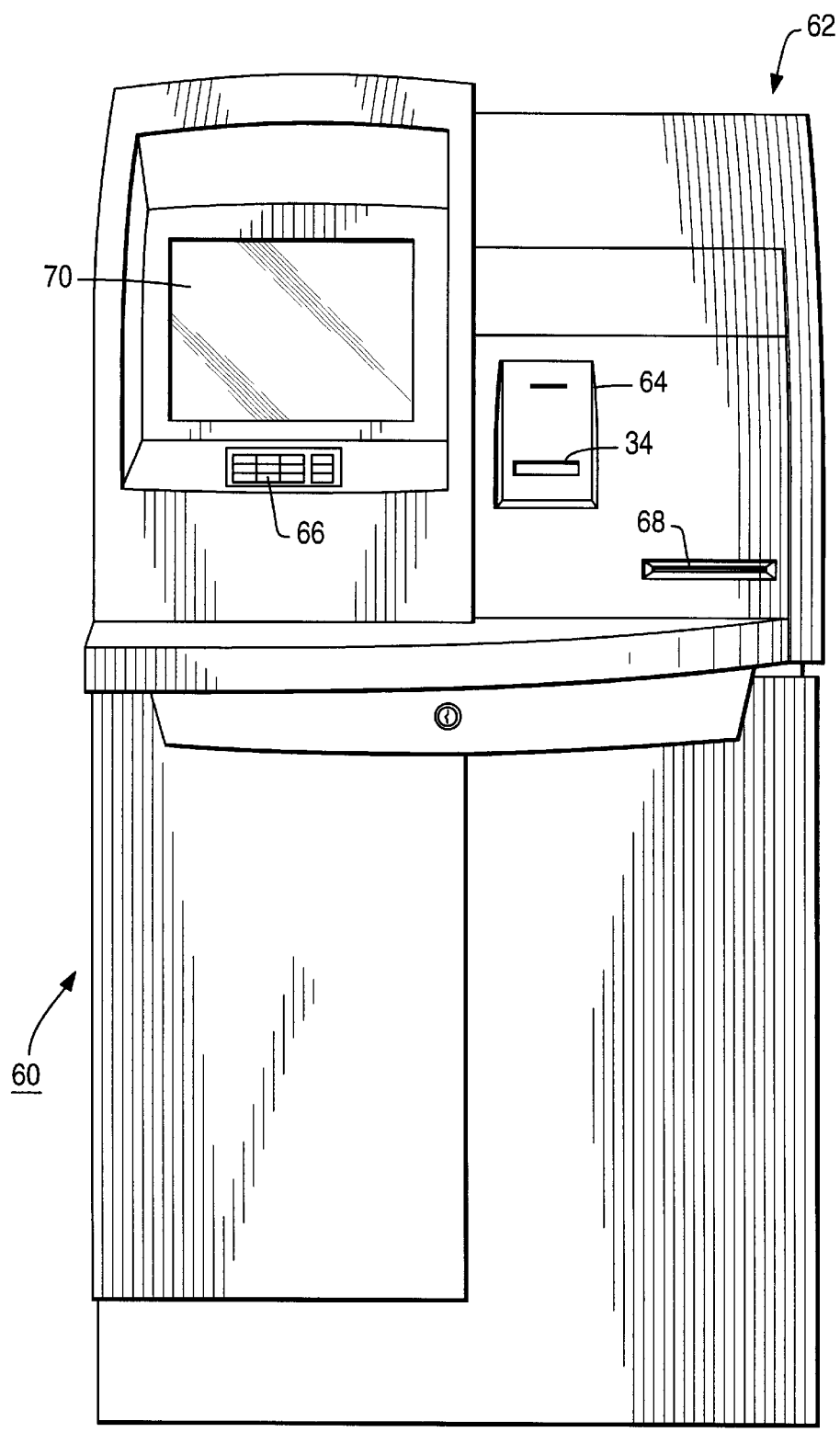

Referring now to FIGS. 3 and 4, an automated teller machine (ATM) 60 including the printing apparatus of FIG. 2 will now be described. The ATM 60 includes a user interface panel 62 and includes a card reader slot 64, a key pad 66, a cash dispenser slot 68, a CRT display screen 70, a receipt printer slot 34 and the host processor 28. The card reader, the cash dispenser mechanism and the receipt printer modules associated with the respective slots 64, 68 and 34 on the user panel 62 of the ATM 60, are designated by the same reference numerals. The ATM 60 further comprises a host control unit 80 which communicates with components of the front panel 62 and with various other operating mechanisms of the ATM 60. The host control unit 80 includes the host processor 28 and a memory unit 82 connected via a bus line to the host processor 28. As illustrated in FIG. 4, the host processor 28 receives input signals from the card reader 64, the keypad 66 and provides output signals to various mechanisms of the cash dispenser 68, the display 70 and to the receipt printer 34. It should be understood that the host processor 28 controls the amount of cash dispensed by the cash dispenser 68, the information displayed on the display 70 and the information printed by the receipt printer 34.

In a typical ATM cash withdrawal transaction, a customer inserts his customer identification card into the card reader slot 64 and data encoded on the card is read. Instructions are then displayed on the screen 70. The customer is requested to enter a personal identification number (PIN) on the key pad 76 which is verified, usually at a central location remote from the ATM 60. If the PIN is determined to be correct, a menu of the various facilities available to the customer is then displayed on the screen 70. If a cash withdrawal facility is selected, the customer is requested to enter the sum required on the key pad 76. This request is transmitted to the host processor 28 as a currency pick operation request for the number of currency notes to be dispensed to the customer. The desired number of notes are picked from a currency cassette (not shown) in the cash dispenser module 68 and are fed by a transport mechanism (not shown) to a stacking mechanism (not shown) and are then delivered to the customer through the cash dispenser slot in the user panel 62 of the ATM 60. Receipt print data for the cash withdrawal transaction and print command data are transmitted from the host processor 28 to the print engine controller 36 and the media handler controller 42 via the driver 146 and/or the data switch 48 as described above in relation to FIG. 2. The receipt print data is then printed on a paper receipt by the print engine mechanism 38 and the receipt bearing details of the cash withdrawal transaction is delivered to the customer by means of the media handler mechanism 44 through the receipt printer slot 38 in the user panel 62 of the ATM 60.

It should be appreciated that the present invention is not restricted to the details of the foregoing embodiment. For example, the present invention may be incorporated in any particular form of self-service terminal and need not necessarily be provided as part of an ATM.

What is claimed is:

1. A printing apparatus comprising:

printing means including (i) a printing device for receiving print data, and (ii) a control device for receiving command data;

a host processor for delivering print data and command data via a common interface to the printing means, the host processor delivering print data with a first characteristic and command data with a second characteristic;

detecting means for detecting the characteristic of data appearing at the common interface; and switch means responsive to the detecting means for ensuring that command data is not routed to the printing device in the event the second characteristic is detected.

2. A printing apparatus according to claim 1, wherein the detecting means is provided in a communication path for delivering command data from the common interface to the control device and response data from the control device to the common interface.

3. A printing apparatus according to claim 2, wherein at least part of the detecting means is provided by part of the control device.

4. A printing apparatus according to claim 1, wherein the characteristics of the respective data delivered from the host processor comprise different states of a command available within a transfer mode.

5. A printing apparatus according to claim 1, wherein the characteristics of the respective data delivered from the host processor comprise different modes for data communication arising in accordance with an established protocol.

6. A printing apparatus according to claim 5, wherein (i) the modes are chosen from those arising in the IEEE 1284 standard, (ii) print data is arranged to be transferred in accordance with Compatibility Mode, and (iii) command data is arranged to be transmitted in accordance with Extended Capabilities Port Mode.

7. A printing apparatus according to claim 1, wherein (i) the printing device comprises a print engine controller and a print engine mechanism, and (ii) the control device comprises a media handler/communications controller and a media handler mechanism.

8. A printing apparatus according to claim 7, wherein direct connectivity is provided between the print engine controller and the media handler/communications controller so as to allow for direct transfer of status or state information from the print engine controller directly to the media handler controller.

9. An automated teller machine (ATM) for allowing an ATM customer to carry out a cash withdrawal transaction, the ATM comprising:

a cash dispenser for dispensing cash to an ATM customer carrying out the cash withdrawal transaction;

a receipt printer including (i) a printing device for receiving print data relating to the cash withdrawal transaction, and (ii) a control device for receiving command data;

a host processor for (i) controlling operation of the cash dispenser to dispense cash to the ATM customer, and (ii) delivering print data relating to the cash withdrawal transaction and command data via a common interface to the receipt printer, the host processor delivering print data with a first characteristic and command data with a second characteristic;

a detector for detecting the characteristic of data appearing at the common interface; and a switch responsive to the detector for ensuring that command data is not routed to the printing device in the event the second characteristic is detected.

10. An ATM according to claim 9, wherein the detector is provided in a communication path for delivering command data from the common interface to the control device and response data from the control device to the common interface.

11. An ATM according to claim 10, wherein at least part of the detector is provided by part of the control device.

12. An ATM according to claim 9, wherein the characteristics of the respective data delivered from the host processor comprise different states of a command available within a transfer mode.

13. An ATM according to claim 9, wherein the characteristics of the respective data delivered from the host processor comprise different modes for data communication arising in accordance with an established protocol.

14. An ATM according to claim 13, wherein (i) the modes are chosen from those arising in the IEEE 1284 standard, (ii) print data is arranged to be transferred in accordance with Compatibility Mode, and (iii) command data is arranged to be transmitted in accordance with Extended Capabilities Port Mode.

15. An ATM according to claim 9, wherein (i) the printing device comprises a print engine controller and a print engine mechanism, and (ii) the control device comprises a media handler/communications controller and a media handler mechanism.

16. An ATM according to claim 15, wherein direct connectivity is provided between the print engine controller and the media handler/communications controller so as to allow for direct transfer of status or state information from the print engine controller directly to the media handler controller.

17. A method of printing a receipt at an automated teller machine (ATM) which allows an ATM customer to carry out a cash withdrawal transaction, the method comprising the steps of:

(a) delivering print data relating to the cash withdrawal transaction and command data from a host processor to a printing unit including a printing device and a control device via a common interface;

(b) assigning a first characteristic to print data relating to the cash withdrawal transaction and a second characteristic to command data;

(c) detecting the characteristic of data from the host processor; and (d) ensuring that command data is not routed to the printing device in response to the second characteristic being detected.

18. A method of printing document, the method comprising the steps of:

(a) delivering print data and command data from a host processor to a printing unit including a printing device and a control device via a common interface;

(b) assigning a first characteristic to print data and a second characteristic to command data;

(c) detecting the characteristic of data from the host processor; and (d) ensuring that command data is not routed to the printing device in response to the second characteristic being detected.

* * * * *